United States Patent Office 2,891,084
Patented June 16, 1959

2,891,084

C₁₉ ALIPHATIC DICARBOXYLIC ACIDS AND METHOD OF PREPARING SAME

Robert M. Alm, Crown Point, and John W. Shepard, Griffith, Ind., assignors to Standard Oil Company, Chicago, Ill., a corporation of Indiana No Drawing. Application April 30, 1956
Serial No. 581,375

6 Claims. (Cl. 260—410.9)

This invention relates to dibasic fatty acids and to esters derived therefrom. More particularly, it relates to a novel class of dicarboxylic acids and esters derived from tall oil fatty acid esters and the like.

Dibasic carboxylic acids occupy a constantly expanding place in the chemical process industry, where they have proved to be useful in a multitude of applications, principally in the formulation of synthetic plastics and resins, including polyamides, polyesters, alkyds, and the like, and ester-type plasticizers therefor. Dibasic acids have long been available in the range of the lower molecular weights, up to around $C_{10}$, and (in the form of dimer acids), in the $C_{36}$ range. Until now, however, there has been no adequate source of dibasic carboxylic acids in the intermediate range of $C_{16}$ to $C_{20}$. It is an object of our invention to provide a source of such an acid and of the esters derivable therefrom.

We have discovered that a mixture of isomeric $C_{19}$ aliphatic dicarboxylic acids can be prepared from tall oil fatty acid esters by a process which includes the steps of Oxo-treating the tall oil fatty acid esters to produce aldehydo derivatives thereof, then subjecting the aldehydo fatty acid esters to caustic oxidation at elevated temperature to convert the aldehyde group into a carboxyl group, and acidifying the resulting salts to spring the desired $C_{19}$ aliphatic carboxylic acids. The acids may conveniently be purified by fractional distillation at reduced pressure, and may thereafter be used as such or converted into esters if desired.

Tall oil is a crude mixture of rosin acids and fatty acids obtained by acidifying the black liquor skimmings of the alkaline paper pulp industry. The fatty acids range from about 18 to 60 percent of the crude tall oil and can be separated therefrom as a fraction substantially free from rosin acids by a simple fractional distillation under reduced pressure. Such a fraction will ordinarily contain approximately equal amounts of oleic and linoleic acids, with up to about 8 percent of palmitic acid, not more than 2 percent of rosin acids, and no linolenic acid. (See Kirk and Othmer, Encyclopedia of Chemical Technology, New York: The Interscience Encyclopedia, Inc., volume 13, pages 572–577). Such a fatty acid fraction is readily esterified by conventional means, suitably with a $C_1$–$C_{10}$ aliphatic alcohol, and the resulting mixture of esters can be employed as the charging stock in our process.

In the first step of our process, we subject a tall oil fatty acid ester fraction to treatment with carbon monoxide and hydrogen under Oxo process conditions, preferably within the following general ranges:

| | |
|---|---|
| Temperature | 300–400° F. |
| Pressure | 2500–4000 p.s.i.g. |
| Catalyst | Cobalt or a cobalt compound. |
| Catalyst concentration | 0.01–1.0 wt.-percent Co. |
| $H_2$/CO | 2:1–1:2. |
| Reaction time | 0.5–5 hours. |

Either batch or flow-type treatment can be employed. Under these conditions, the olefinic components of the charging stock are converted nearly completely into the aldehydo derivatives of the original esters, and to some extent into the corresponding hydroxyl derivatives, which are produced by concurrent hydrogenation of the aldehydo groups. Oleic acid esters, for instance, are converted into $C_{19}$ carboxylic acid esters with an aldehydo group attached to the carbon chain. The point of attachment is random, since the olefinic double bond shifts rapidly along the carbon chain under Oxo conditions. Linoleic acid esters, which are unconjugated diolefinic compounds, can undergo several reactions. If the double bonds isomerize to a conjugated position, one double bond is hydrogenated and the other is Oxoated to yield an end product of the type obtained from oleic acid esters. If Oxoation should occur prior to such isomerization, a dialdehydo ester might result from separate Oxoation of both double bonds. It might also be expected, from our experience in the Oxo treatment of dipentene and other diolefinic materials, that linoleic acid esters would dimerize to some extent before Oxoation. In either of the latter cases, undesirable products of high molecular weight would be obtained. Surprisingly, however, we find that our charging stock does not undergo such side reactions in any considerable degree, but is converted almost entirely into the desired $C_{19}$ aldehydo esters.

In the second step of our process, the crude Oxo product is subjected to oxidation to convert the aldehyde groups and any alcohol groups into carboxyl groups. No prior purification or isomerization of the aldehyde intermediate is necessary. The preferred technique for effecting the oxidation is to treat the crude Oxo product with caustic alkali at elevated temperature. This can conveniently be done by adding the crude Oxo product slowly with agitation to a slurry of sodium hydroxide or potassium hydroxide in cetane, mineral oil, kerosene, or other inert liquid at a temperature within the range of about 400 to 600° F. For instance, a slurry of 5 to 10 pounds of NaOH or 85% KOH per gallon of heavy white oil can be used. The total quantity of caustic employed should be at least sufficient to oxide the aldehyde and alcohol groups present in the Oxo product, to neutralize the resulting acids, and to saponify the ester groups. The rate of addition should be controlled to avoid any substantial accumulation of unconverted aldehyde within the reaction vessel. Alternatively, the caustic can be introduced into the reaction vessel as a concentrated aqueous solution simultaneously with the crude Oxo product. Hydrogen is evolved during the oxidation, and the reaction is complete when hydrogen evolution ceases. The reaction product, consisting essentially of a mixture of salts of the desired dicarboxylic acids, is suitably quenched in water, and the acids may be liberated from the resulting aqueous solution by addition of a stoichiometric quantity of hydrochloric acid, sulfuric acid, or other strong mineral acid.

The crude dicarboxylic acids obtained thereby are suitable for many uses without further treatment. However, since they generally contain a small proportion of mono-carboxylic acids and higher-boiling polymeric materials resulting from various side reactions, it is desirable to subject them to some degree of purification by conventional means, suitably by fractional distillation at reduced pressure, by selective extraction, by esterification followed by fractional distillation, or the like.

In one aspect, our invention is a mixture of isomeric $C_{19}$ aliphatic dicarboxylic acids having the general formula

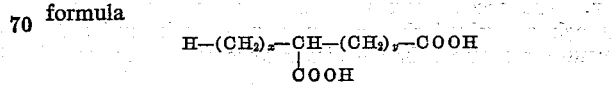

where $x$ and $y$ are numbers from zero to 16, totaling 16.

In another aspect our invention is a mixture of diesters derived by esterifying a mixture of acids of the class defined above by conventional techniques with a monohydric aliphatic alcohol containing from 1 to 12 carbon atoms in the molecule. Examples of suitable alcohols are methyl, ethyl, n-propyl, isopropyl, butyl, amyl, neopentyl, isooctyl, decyl, lauryl, and the like. Esters derived from primary alcohols are preferred for most uses because of their superior stability. Of particular interest are the diesters containing from 25 to 31 carbon atoms. These materials are effective plasticizers for polyvinyl chloride, to which they impart excellent low-temperature properties. Also highly useful are the dineopentyl esters, which have excellent thermal stability and have been found to be suitable as a base for synthetic lube oils and as an additive for motor oils.

In a further aspect, our invention is a method for treating tall oil fatty acid esters to produce $C_{19}$ aliphatic dicarboxylic acids and esters, substantially as herein described. It is a remarkable fact, noted above, that the mixture of compounds comprised therein is converted into the single class of dicarboxylic acids of our invention.

The following operating example will more fully illustrate our invention.

Example

A total of 1472 grams (5 moles) of tall oil fatty acid methyl esters consisting of approximately 55 weight-percent methyl oleate and 45 weight-percent methyl linoleate was subjected to Oxo treatment in a rocking bomb under the following conditions:

| | |
|---|---|
| Temperature | 330–350° F. |
| Pressure | 3000–4000 p.s.i.g. |
| $H_2$/CO ratio | 1. |
| Catalyst | Cobalt tallate. |
| Catalyst concentration | 0.2 weight-percent Co. |
| Reaction time | 1 hour. |

The crude product was found to have gained a total of 144 grams in weight, or about 92 percent of theory, calculated on the assumption that the methyl linoleate was converted entirely into a monoaldehyde-ester product.

A portion (409 grams) of the crude Oxo product was added with stirring over a period of 5 hours to a slurry of 247 grams of potassium hydroxide (85% KOH) in 300 milliliters of cetane, maintained at 482 to 536° F. The rate of addition was sufficiently slow to prevent build-up of unoxidized aldehyde in the reaction vessel. The quantity of caustic was sufficient to insure oxidation of the aldehyde group (and any corresponding alcohol group) as well as saponification of the ester group.

When the caustic treatment had reached completion, the product was cooled, dissolved in 2.5 liters of aqueous 25 volume-percent ethanol, and refluxed to insure complete saponification of the esters. The mixture was then filtered to remove insoluble cobalt compounds and de-oiled by two extractions with 500-milliliter portions of hexane. The acids were thereafter sprung by adding the soap solution to 335 milliliters of concentrated (37%) hydrochloric acid, yielding a crude acid mixture weighing 440 grams. The crude mixture was washed with water while hot to remove inorganic salts.

The product acids were esterified and purified by following method. About 940 grams of crude acids that had been prepared according to the procedure described above were esterified by refluxing with ethanol and benzene in the presence of an acid catalyst and withdrawing water overhead until the reaction had reached completion. The crude esters were then fractionally distilled through a twelve-inch Vigreux column under reduced pressure to separate the $C_{19}$ dicarboxylic acid esters from the impurities. The composition of the crude ester mixture, as determined by the distillation was as follows:

| Fraction No. | Boiling Range, ° C. at 0.5 mm. Hg | Weight, g. | Proportion, wt. percent | Composition |
|---|---|---|---|---|
| 1 | 84–170 | 99 | 9.5 | $C_{17}H_{35}COOC_2H_5$. |
| 2 | 170–220 | 753 | 73.5 | $C_{17}H_{34}(COOC_2H_5)_2$. |
| 3 | Over 220 | 176 | 17.0 | Half-ester, Oxo bottoms, and polymer. |

Fraction No. 2 was redistilled, and the heart fraction thereof, weighing 519 grams was analyzed, with the following results:

| | |
|---|---|
| Boiling point | 190–200° C. at 0.5 mm. Hg. |
| Molecular weight (in benzene) | 365±10. |
| Refractive index ($n_D^{20}$) | 1.4490. |
| Acid No. | 7.9. |
| Ester No. (in ethylene glycol) | 268. |
| Iodine No. | 4.5. |
| Aldehyde, as $C_{21}$ aldehydo-ester | Less than 3 wt.-percent. |
| Alcohol, as $C_{21}$ alcohol-ester | 2.3 wt.-percent. |

| Analysis | Found | Calculated (for $C_{23}H_{44}O_4$) |
|---|---|---|
| | Percent | Percent |
| C | 72.55, 72.15 | 72.03 |
| H | 11.64, 11.65 | 11.53 |
| O | 16.38 | 16.64 |

A crude $C_{19}$ dicarboxylic acid fraction, prepared as described above, was fractionally distilled at reduced pressure and separated into the following fractions:

| | wt.-percent |
|---|---|
| Monobasic acid | 13 |
| Dibasic acid | 76 |
| Bottoms | 11 |

The heart cut (dibasic acid fraction) was a water-white solid melting slightly above room temperature.

The foregoing example demonstrates that we can prepare a mixture of isomeric $C_{19}$ aliphatic dicarboxylic acids and esters in high yields from tall oil fatty acid esters. These isomeric acids and esters are not available from any other source, and are valuable in themselves and as intermediates in the preparation of a variety of compositions already in commercial use. Among such compositions are alkyd resins, polyester plastics and fibers, plasticizers, surface-active agents, synthetic lube oils, and lube oil additives. Our new acids are especially useful for the preparation of superior types of polyamide resins by reaction with diamines, such as asparagine, hexamethylenediamine, and the like.

The novel products of our invention are advantageously prepared from tall oil fatty acid esters, as set forth hereinabove, and such esters are our preferred charging stock. They may also be prepared, however, from unsaturated $C_{18}$ aliphatic monocarboxylic acid esters obtained from other sources, such as esters of oleic acid, linoleic acid, and linolenic acid, prepared synthetically or from soya bean oil, linseed oil, cottonseed oil, and the like.

While we have described our invention with reference to a specific operating example, it is to be understood that the conditions and techniques described therein are illustrative only and not by way of limitation. Numerous modified and equivalent process details will be apparent to those skilled in the art from the foregoing description.

In accordance with the foregoing description, we claim as our invention:

1. A process for the preparation of an isomeric mixture of compounds oxidizable to $C_{19}$ aliphatic dicarboxylic acids having the general formula:

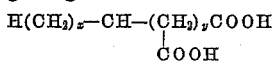

where $x$ and $y$ are numbers from zero to 16, totalling 16, which comprises contacting as a feed stock a mixture of tall oil esters consisting essentially of oleic and linoleic acid esters derived by fractionation of tall oil to separate rosin acids and esterification with a $C_1$ to $C_{12}$ aliphatic alcohol with a mixture of carbon monoxide and hydrogen in a molar ratio between 2:1 and 1:2 at a temperature between about 300° and 400° F. and a pressure between about 2500 and 4000 pounds per square inch gage for a period of about 0.5 to 5 hours in the presence of an Oxo process catalyst containing between about 0.1 and 1.0% by weight of cobalt based on said mixture of esters whereby said esters are substantially converted into $C_{19}$ aldehydo carboxylic acid esters.

2. The process of claim 1 wherein said feed stock comprises the methyl esters of tall oil fatty acids.

3. A process for the preparation of an isomeric mixture of $C_{19}$ aliphatic dicarboxylic acids having the general formula

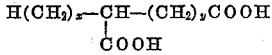

where $x$ and $y$ are numbers from zero to 16, totalling 16, which comprises the steps of contacting as a feed stock a mixture of tall oil esters consisting essentially of oleic and linoleic acid esters derived by fractionation of tall oil to separate rosin acids and esterification with a $C_1$ to $C_{12}$ aliphatic alcohol with a mixture of carbon monoxide and hydrogen in a molar ratio between about 2:1 and 1:2 at a temperature between about 300° and 400° F. and a pressure between about 2500 and 4000 pounds per square inch gage for a period of about 0.5 to 5 hours in the presence of an Oxo process catalyst containing between about 0.1 and 1.0 percent by weight of cobalt based on said tall oil fatty acid ester, whereby said ester is converted into $C_{19}$ aldehydo carboxylic acid esters, commingling the resulting reaction product with caustic alkali at a temperature between about 400° and 600° F. until hydrogen evolution substantially ceases, whereby said aldehydo carboxylic acid esters are converted into salts of the corresponding $C_{19}$ aliphatic dicarboxylic acids, cooling and acidifying the resulting reaction product with a strong mineral acid, whereby said dicarboxylic acids are liberated, and recovering and purifying said acids.

4. The process of claim 3 wherein said feed stock comprises the methyl esters of tall oil fatty acids.

5. The process of claim 3 in which the commingling with caustic alkali is conducted by contacting the aldehydo carboxylic acid esters with a slurry of finely divided caustic alkali in an inert liquid and heating the mixture with agitation.

6. The mixture of isomeric $C_{19}$ aliphatic dicarboxylic acids as defined in claim 3 and produced by the process defined therein.

References Cited in the file of this patent

UNITED STATES PATENTS

| | | |
|---|---|---|
| 2,517,383 | Brooks | Aug. 1, 1950 |
| 2,548,594 | Smith | Apr. 10, 1951 |
| 2,599,468 | McKeever | June 3, 1952 |
| 2,610,203 | Hagemeyer et al. | Sept. 9, 1952 |
| 2,680,713 | Lindsey et al. | June 8, 1954 |
| 2,738,370 | Staib et al. | Mar. 13, 1956 |
| 2,766,267 | Hill | Oct. 9, 1956 |
| 2,810,748 | Stewart et al. | Oct. 22, 1957 |
| 2,814,639 | Bartlett | Nov. 26, 1957 |

OTHER REFERENCES

Copenhaver et al.: "Acetylene and Carbon Monoxide Chemistry" (1949), pp. 269–270.

Adkins et al.: J. Org. Chem. 17, 980–7 (1952).

Kodama et al., Chem. Abs. 49., 5005a–c (1955).